(12) United States Patent
Healy

(10) Patent No.: US 7,127,898 B2
(45) Date of Patent: Oct. 31, 2006

(54) METHOD AND SYSTEM FOR INCORPORATING AN EMISSION SENSOR INTO A GAS TURBINE CONTROLLER

(75) Inventor: Timothy Andrew Healy, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/275,173

(22) Filed: Dec. 16, 2005

(65) Prior Publication Data

US 2006/0080965 A1    Apr. 20, 2006

Related U.S. Application Data

(62) Division of application No. 10/712,991, filed on Nov. 17, 2003, now Pat. No. 7,032,388.

(51) Int. Cl.
*F02C 9/28* (2006.01)
(52) U.S. Cl. ..................... 60/773; 60/39.281
(58) Field of Classification Search ............ 60/39.281, 60/772, 773, 803
See application file for complete search history.

(56) References Cited

U.S. PATENT DOCUMENTS

| | | | | |
|---|---|---|---|---|
| 4,249,238 A | * | 2/1981 | Spang et al. | 701/100 |
| 4,773,213 A | * | 9/1988 | Krukoski et al. | 60/39.281 |
| 5,703,777 A | * | 12/1997 | Buchhop et al. | 60/39.281 |
| 6,892,127 B1 | * | 5/2005 | Wiseman | 701/100 |
| 2004/0030417 A1 | * | 2/2004 | Gribble et al. | 700/29 |

* cited by examiner

*Primary Examiner*—L. J. Casaregola
(74) *Attorney, Agent, or Firm*—Nixon & Vanderhye P.C.

(57) ABSTRACT

A method for determining an estimated operating parameter for a gas turbine including the steps of: determining an estimated operating parameter using an algorithm have an input from a sensor, wherein the algorithm includes a trim factor; determining a first trim factor based on a comparison of the first estimated operating parameter and the output of the sensor when a condition of the sensor is in a first mode, and during a subsequent determination of the estimated operating parameter, applying the first trim factor to subsequently determine the estimated operating condition if the condition of second sensor is in a second mode.

20 Claims, 4 Drawing Sheets

METHOD AND SYSTEM FOR INCORPORATING AN EMISSION SENSOR INTO A GAS TURBINE CONTROLLER

CROSS RELATED APPLICATION

This application is a divisional of and claims priority to U.S. patent application Ser. No. 10/712,991 filed Nov. 17, 2003 now U.S. Pat. No. 7,032,388.

BACKGROUND OF THE INVENTION

The present invention relates generally to controllers for a combustion system for a gas turbine. In particular, the invention relates to a combustor control algorithm for a Dry Low NOx (DLN) combustor.

Industrial and power generation gas turbines have control systems ("controllers") that monitor and control their operation. These controllers govern the combustion system of the gas turbine. To minimize emissions of carbon-monoxide and nitric-oxides (NOx), DLN combustion systems may include control scheduling algorithms that receive as inputs measurements of the exhaust temperature of the turbine, the actual operating compressor pressure ratio, and the actual emissions levels.

Emissions sensors are needed to monitor emission levels in the turbine exhaust. Industrial gas turbine engine control systems generally employ triplex redundancy for control process and safety critical sensors. Triplex redundancy is often needed to satisfy safety and reliability expectations and requirements of customers and governmental agencies. Providing three emission sensors for a turbine exhaust is expensive, and adds to the maintenance and calibration requirements of the gas turbine. There is a need for a cost effective approach to directly controlling emission levels in a gas turbine.

BRIEF SUMMARY OF THE INVENTION

The invention may be embodied as a method for determining an estimated operating parameter for a gas turbine including the steps of: determining an estimated operating parameter using an algorithm have an input from a sensor, wherein the algorithm includes a trim factor; determining a first trim factor based on a comparison of the first estimated operating parameter and the output of the sensor when a condition of the sensor is in a first mode, and during a subsequent determination of the estimated operating parameter, applying the first trim factor to subsequently determine the estimated operating condition if the condition of second sensor is in a second mode.

The invention may also be embodied as a method for determining an estimated operating emission level in the exhaust stream of a gas turbine comprising: periodically determining an estimated emission level from an output of emissions transfer algorithm, wherein said algorithm includes a trim factor; determining a current trim factor based on a ratio of a current output of a healthy emission sensor monitoring the exhaust and of the estimated emission level from a prior determination, and applying a prior trim factor previously applied to determine the estimated operating condition if the emission sensor is unhealthy.

The invention may be further embodied as a system for determining an estimated operating parameter for a gas turbine having an exhaust and a fuel controller comprising: a controller including a processor executing a combustion temperature scheduling algorithm and emissions transfer function stored in electronic memory of the controller, wherein said scheduling algorithm outputs a temperature request signal applied to generate a fuel control command for said fuel controller and said scheduling algorithm receives as an input a trim factor based on an estimated emission level generated by the emissions transfer function, wherein said emissions transfer function includes a emissions correction factor; a emission sensor measuring a emission level in the exhaust, wherein said sensor has an operating mode and a suspended mode; a trim factor switch selectively operating said sensor in said modes, wherein said switch selects a current emissions correction factor or a prior emissions correction factor to be applied to the emissions transfer function on a sensor condition input signal applied to the switch.

BRIEF DESCRIPTION OF THE DRAWINGS

The accompanying drawings in conjunction with the text of this specification describe an embodiment(s) of the invention.

DETAILED DESCRIPTION OF THE INVENTION

Figure 1:
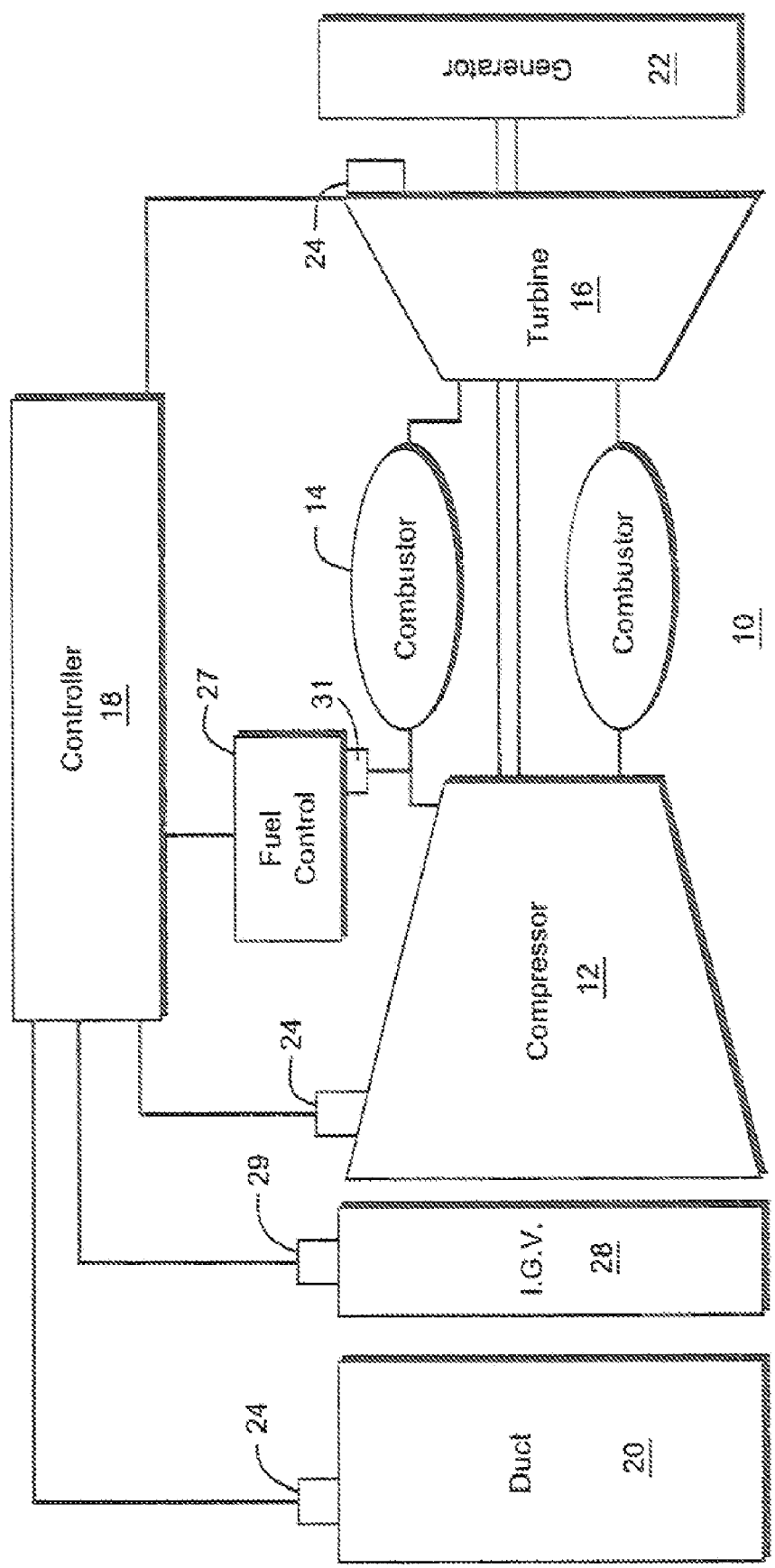
FIG. 1 is a schematic depiction of a gas turbine having a fuel control system.

FIG. 1 depicts a gas turbine 10 having a compressor 12, combustor 14, turbine 16 drivingly coupled to the compressor and a control system 18. An inlet duct 20 to the compressor feeds ambient air and possibly injected water to inlet guide vanes (IGVs) 28 and to the compressor. The turbine may drive a generator 22 to produce electrical power.

The operation of the gas turbine may be monitored by several sensors 24 detecting various conditions of the turbine, generator and environment. For example, temperature sensors may monitor compressor discharge temperature, turbine exhaust gas temperature, and other temperature measurements of the gas stream through the gas turbine. Pressure sensors may monitor static and dynamic pressure levels at the compressor inlet and outlet, and turbine exhaust, as well as at other locations in the gas stream. The sensors 24 may also comprise flow sensors, speed sensors, flame detector sensors, valve position sensors, guide vane angle sensors, or the like that sense various parameters pertinent to the operation of gas turbine 10. Typically, pressure, temperature, flow, speed, IGV and many other sensors on a gas turbine are extremely reliable, require infrequent calibration and maintenance and are inexpensive, at least as compared to some of the more recent emission sensors that are available for monitoring emissions. As used herein, "parameters" and similar terms refer to items that can be used to define the operating conditions of turbine, such as temperatures, pressures, and flows at defined locations in the turbine that can be used to represent a given turbine operating condition.

The controller may be a General Electric SPEED-TRONIC™ Gas Turbine Control System, such as is described in Rowen, W. I., "SPEEDTRONIC™ Mark V Gas Turbine Control System", GE-3658D, published by GE Industrial & Power Systems of Schenectady, N.Y. The controller 18 may be a computer system having a processor(s) that executes programs to control the operation of the gas turbine using sensor inputs and instructions from human operators. The programs executed by the controller 18 may include scheduling algorithms for regulating fuel flow to the combustor 14 and the angle of the inlet guide vanes (IGV). The commands generated by the controller cause a fuel controller 27 on the gas turbine to, for example, adjust valves 31 between the fuel supply and combustors that regulate the flow and type of fuel, and actuators 29 to adjust the angle of the IGVs 28 on the compressor.

The controller 18 regulates the gas turbine based, in part, on algorithms stored in computer memory of the controller. These algorithms enable the controller 18 to maintain the NOx and CO emissions in the turbine exhaust to within certain predefined limits, and to maintain the combustor firing temperature to within predefined temperature limits. The combustor 14 may be a DLN combustion system. The control system 18 may be programmed and modified to control the DLN combustion system.

Gas turbine engines with ultra-low emissions combustors, e.g., DLN combustion systems, require precise control so that the turbine gas emissions are within limits established by the turbine manufacturer, and to ensure that the gas turbine operates within certain operability boundaries, e.g., lean blowout, combustion dynamics, and other parameters. Control systems for ultra-low emission combustors generally require highly accurate and calibrated emission sensors. In the past, calibration of these sensors required field service engineers to regularly adjust settings on the controller and emissions sensors to accommodate changes in the operation of the gas turbine due to wear and other conditions.

Conventional closed-loop systems employ emission sensors to measure emissions levels in the turbine exhaust and provide feedback data used by control algorithms. For example, emissions sensors at the turbine exhaust provide data on current emissions levels that is applied in determining a turbine exhaust temperature request. Emissions sensors are expensive, have relatively large processing delay (on the order of minutes), can be unreliable, and generally require frequent calibration and maintenance. The expense, delay, reliability, maintenance, and calibration issues associated with emissions sensing equipment pose unique problems for a closed-loop approach.

Operation of an industrial gas turbine engine requires the control system to set the total fuel flow, compressor inlet guide vane (IGV), inlet bleed heat (IBH), and combustor fuel splits to achieve the desired cycle match point (i.e. generate the desired output and heat-rate while observing operational boundaries). Total fuel flow and IGV position are dominant effectors in achieving the desired result. A typical part-load control mode involves setting fuel flow and the IGV angle to satisfy the load (generator output) request, and to observe an exhaust temperature profile (temperature control curve). When base-load operation is achieved, the IGV is typically at an angle of maximum physical limit. At base-load, fuel flow alone is generally adjusted to observe an exhaust temperature profile needed to satisfy emission limits and other gas turbine operating limits.

Figure 2:
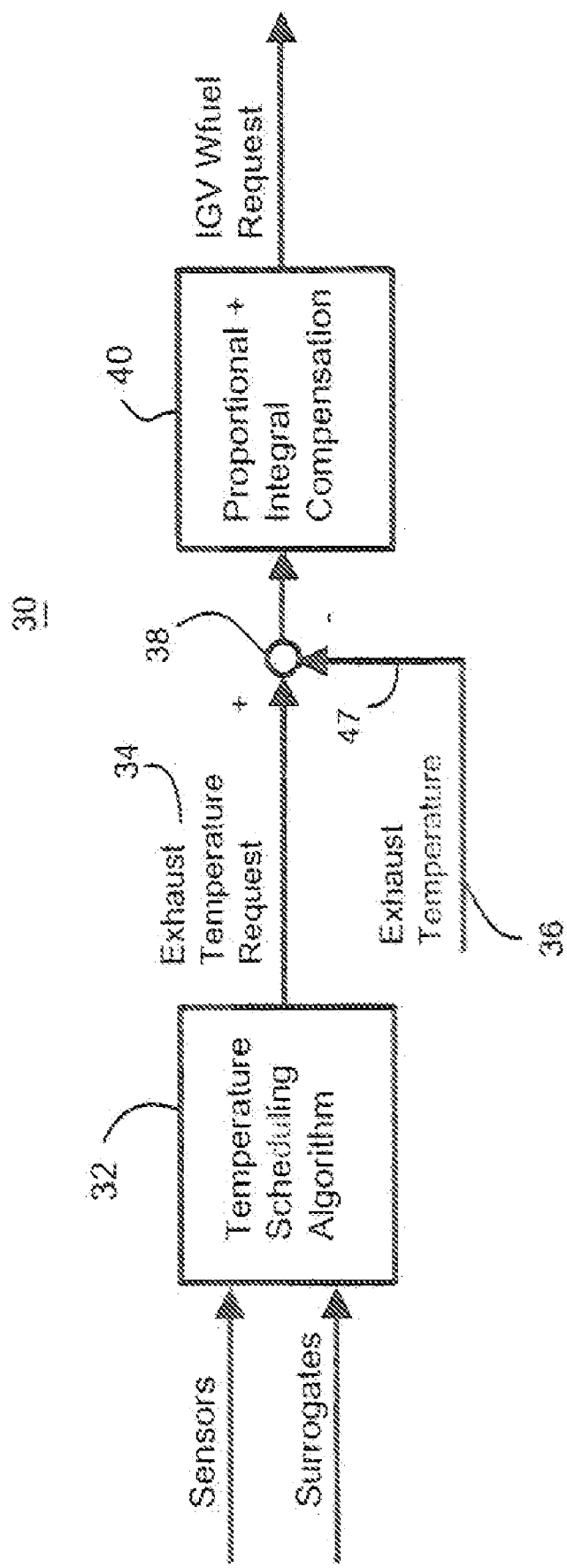
FIG. 2 is a block diagram of an emission limiting system including a closed-loop control temperature scheduling algorithm to trim a reference exhaust temperature request applied to control the gas turbine.

FIG. 2 shows a high-level block diagram of an exhaust temperature controller 30. At this high level, the controller appears as a conventional exhaust temperature controller. Sensors and surrogates are provided to a temperature scheduling algorithm 32 to define an exhaust temperature request 34.

The temperature scheduling algorithm 32 receives input signals regarding the operation conditions of the gas turbine directly from sensors and from surrogates. Sensor signals provide data regarding parameters of the gas turbine that are directly monitored by the sensors. For example, temperature and pressure sensors may directly measure the temperatures and pressures at the gas turbine inlet, at various stages of the compressor and at the turbine exhaust. Similarly, speed sensors may measure the rotational speed of the gas turbine and flow sensors may measure the fuel flow into the combustor. Surrogates are parameters of the gas turbine that are not directly sensed, but are rather parameters determined based on algorithms and correlations based on sensor data regarding other operating conditions.

The exhaust temperature request 34 is compared to an actual exhaust temperature level 36 to generate a difference signal 38 that is applied to a proportional integral compensation unit 40 which generates control values for operating the gas turbine. The control values may be inlet guide vane (IGV) settings and fuel settings that are applied to adjust the IGVs and to the fuel controller for the combustor of the gas turbine. The proportional integral compensation unit may be conventional.

Figure 3:
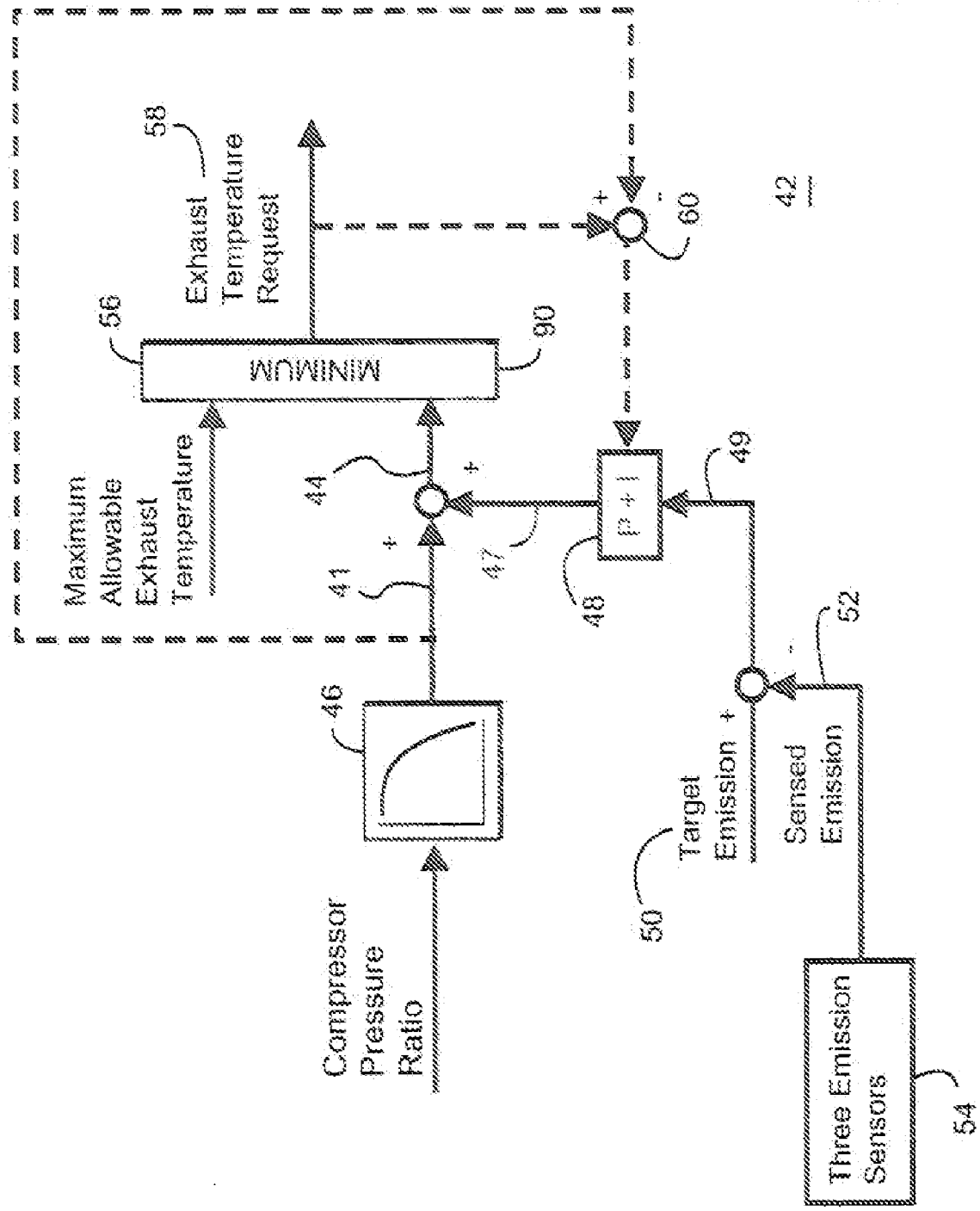
FIG. 3 is a block diagram of a conventional emissions-trim temperature scheduling algorithm.

FIG. 3 depicts a conventional emissions-trim temperature scheduling algorithm 42 that includes a emissions trim function (49, 50 and 52). A reference exhaust temperature 41 is determined based on the compressor pressure ratio (CPR) and a graph, look-up table or other correlation 46 that converts the CPR to the reference exhaust temperature 41. The reference exhaust temperature 41 is trimmed (added to or subtracted from) by an output of a proportional plus integral (P+I) compensation algorithm 48 that outputs a trim value 47 to be summed with the reference exhaust temperature 44. The trim value 47 is determined by the P+I unit based on a emission error value 49 which is a difference between a target emission value 50 and a sensed emission level 52 that is measured by emissions sensors 54, e.g., NOx sensors. Given the need for triple redundancy in critical components, three emissions sensors 54 are employed in a conventional emissions-trim temperature scheduling algorithm.

The trimmed reference exhaust temperature 44 is compared to a maximum allowable exhaust temperature in a minimum check algorithm 56 generate an exhaust temperature request 58. The difference 60 between the reference exhaust temperature 44 and the exhaust temperature request 58 is used to reset the integral part of the P+I unit 48 to guard against integrator wind-up.

Generally, the emissions trim function has only limited authority to guard against sensor failure or extreme sensor drift. If the emissions sensors fail or become uncalibrated, the emissions control system may become disabled. Industrial gas turbine engine control systems generally employ triplex redundancy for control process and safety critical sensors. Triplex redundancy is often needed to satisfy safety and reliability expectations and requirements of customers and governmental agencies. Providing three emission sensors 54 for a turbine exhaust can be extremely expensive, and increase the maintenance requirements of the gas turbine.

If a closed-loop control system for emission could be relieved of the requirement for triple redundancy in sensor signals and only a single emissions sensor employed, then significant product cost could be avoided and the maintenance requirements reduced. However, employing an emissions sensor in a conventional closed-loop fashion places a significant system safety and reliability burden on that sensor.

The processing delay inherent with stat-of-the-art emissions sensing equipment is typically on the order of several minutes. Emissions compliance requirements will typically allow short periods of non-compliance (on the order of seconds), but not significant periods of non-compliance. The time delay associated with emissions sensing equipment is such that the sole reliance on the sensor is not sufficient to ensure compliance when operational and environmental conditions are changing.

Emissions sensors 54 must be regularly maintained to ensure that they are operating properly and that emission levels do not exceed allowable limits. In particular, emissions sensing equipment requires frequent calibration to ensure accuracy in emission measurements. Sensor drift is usually caused by changes in ambient temperature. If only a single sensor is employed in the control system shown in FIG. 3, then special operational restrictions would necessarily be placed on the gas turbine while the sensor was being calibrated. Such operational restrictions would be required to avoid violation of gas system operability boundaries, and would have a negative impact on the continuous operation of the gas turbine. Where there is a single emission sensor failure of that one sensor can result in the benign problems (such as non-compliance with emissions requirements, slight over or under-fire) and serious problems (blowout, trip, failure). A method is needed to reduce the cost of closed-loop control of emissions that does not sacrifice system safety and reliability, and does not impose operational restrictions on the operation of the gas turbine.

Figure 4:
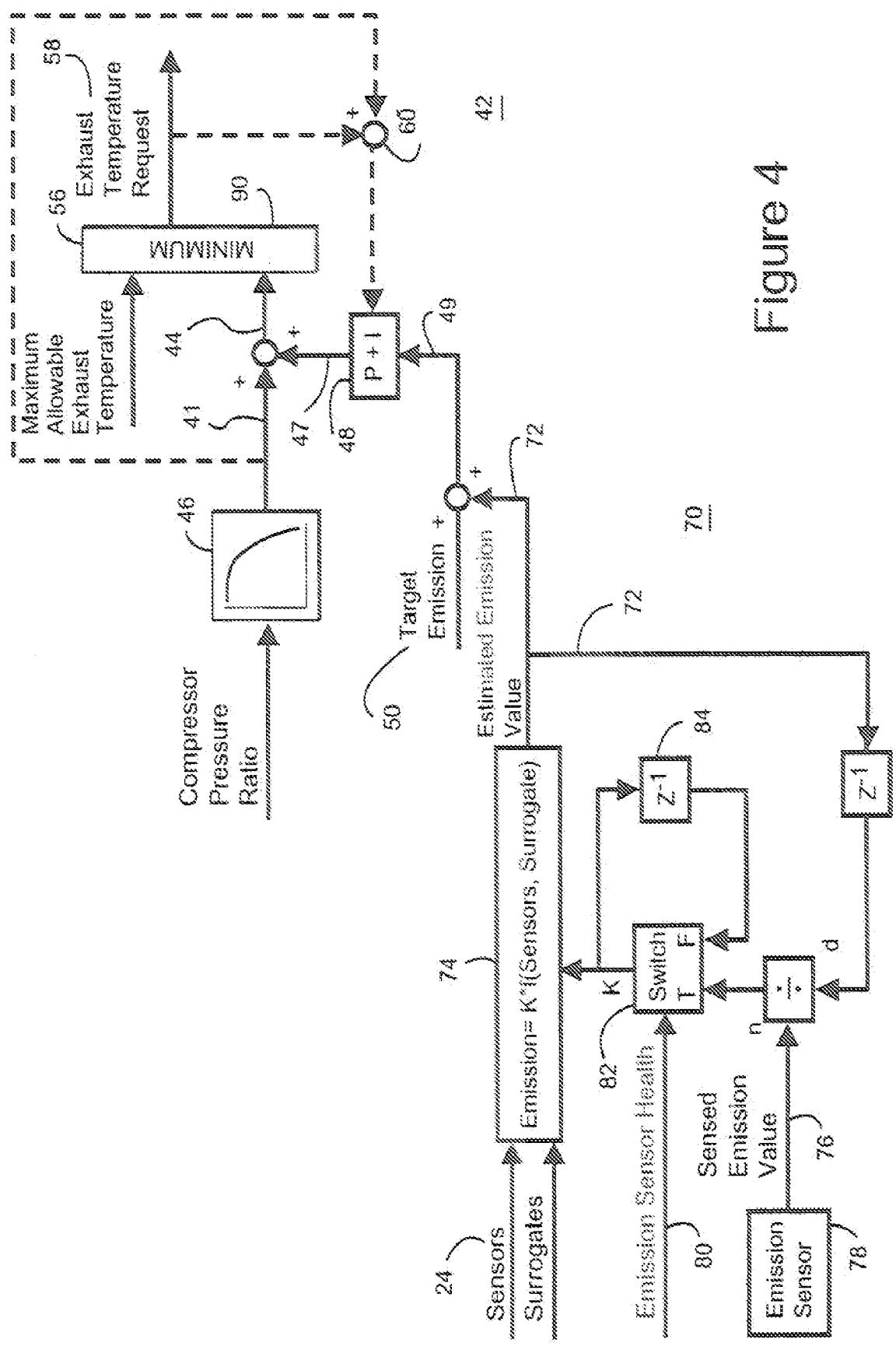
FIG. 4 is a block diagram of a emissions-trim temperature scheduling algorithm having a emission model-based trim factor.

FIG. 4 depicts a closed loop, model-based emissions-trim temperature scheduling algorithm 70 that generates an estimated emission level 72 that is applied to trim 47 an exhaust temperature request 41. The estimated emission level 72 is used instead of the sensed emission level 52 of the conventional system shown in FIG. 3. In the emissions model-based algorithm, the closure of the emission control system 70 is performed on an estimated emissions level 72 that is the output of a physics-based emissions transfer function 74. The emissions transfer function 74 receives as inputs data from sensors and surrogates, such as, compressor discharge temperature, specific humidity of ambient air, fuel split ratio and firing temperature. The transfer function 74 models the relationship between emissions and the cycle match point of the gas turbine. The sensors 24 used to generate the sensor data and the surrogates data for the emissions transfer function may be conventional sensors, e.g., temperature pressure and specific humidity sensors, that are typically used with a gas turbine and which are typically triple redundant.

The emissions transfer function 74 is tuned (K) to match a sensed emission level 76, when the emissions sensor 78 is deemed to be "healthy." The correction factor (K) that is applied to the emissions transfer function to adjust the estimated emission level 72. The correction factor (K) is determined from a comparison, e.g., ratio, of the estimated emissions value 72 to a sensed emissions value 76. In the example shown here, the correction factor (K) is a ratio of the estimated emissions value for a preceding determination ($Z^{-1}$) by the emissions transfer function 74 and the sensed emissions value 76. The emissions transfer function 74 determines the estimated emissions level 72 periodically, such as every compute cycle of the controller (40 ms).

A correction factor (K) of 1.0 indicates that the estimated emissions and sensed emissions values are the same. The extent to which the correction factor K is smaller or greater than 1.0 indicates the extent to which the estimated emissions value differs from the sensed emissions value. The correction factor need not be a ratio. It may be a difference between the estimated and sensed emissions values, or determined by a look-up table or function. For example, further, the correction factor (K) need not be a constant, but may be vary exponentially or a function of another parameter. There may be multiple correction factors applied to the emissions transfer function based on a multitude of accumulated data.

A sensor condition signal 80 is provided that indicates whether the emissions sensor 78 is "healthy" or "unhealthy". A healthy emissions sensor may be a sensor that is operating within an expected range and is not undergoing calibration. The conditions for which a sensor is deemed healthy may be determined for each gas turbine or class of gas turbines. For example, the sensor condition signal may be set to "healthy" if the sensor is not currently undergoing maintenance and calibration, the gas turbine has not recently changed its operating conditions, and the sensor is operating within the expected range. The sensor 78 may be a single NOx emissions sensor and the transfer function 74 may predict a NOx emissions level.

When the sensor 78 is deemed to be un-healthy, the tuning process is switched 82 (F) to suspend the emissions sensor and apply a previous value 84 ($Z^{-1}$ of K) of the correction factor (K). This previous K-value is maintained until sensor health is restored. The switch 82 determines whether the correction factor (K) is a prior K-value 84 or a value determined from the actual emission level currently sensed by the emissions sensor 78. The switch 82 may also suspend the operation of the emissions sensor, while a prior K-value us applied to the emissions transfer function 74.

The prior value 84 of K is repeatedly used as the correction factor for the trim temperature function 70 until the switch 82 is reset by a signal 80 that the sensor is healthy. The switch 82 may hold the emissions sensor 78 in an suspended mode during steady state operation of the gas turbine and while ambient conditions, e.g., specific humidity remain relatively constant; while the emissions sensor is being calibrated, and while the sensor is producing out of range levels. By suspending emission sensing during extended periods of gas turbine operation, the emissions sensor 78 requires less frequent maintenance and calibration and the amount of wear on the sensor is reduced.

The model-based approach reduces the emission system dependency on the single emissions sensor 78 by only periodically using the sensor to tune the correction factor (K). At other times, the same correction factor 84 is reused by the control-resident physics-based emissions transfer function 74. The correction factor (K) may be applied (while the switch is set to F) even if the emissions sensor 78 has failed or is out of calibration. The use of an estimated emission level and a correction factor (K) that is periodically tuned using a emissions sensor maintains the overall gas turbine system safety and reliability, while simultaneously providing relief from the need for triple redundant emissions sensors. The dependency on redundant sensors is shifted to existing triple redundant gas turbine sensors, e.g., compressor discharge temperature (TCD), compressor discharge pressure (PCD), temperature sensors (Tx), and output power sensors. With the model-based approach for the emission level, the need is lessened to impose operational restrictions to accommodate emissions sensor calibration is, and there is less risk of gas turbine operating limit boundary violations resulting from emissions sensor failures.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A system for determining an estimated operating parameter for a gas turbine having an exhaust and a fuel controller comprising:
    a controller including a processor executing a combustion temperature scheduling algorithm and an emissions transfer function stored in electronic memory of the controller, wherein said scheduling algorithm outputs a temperature request signal applied to generate a fuel control command for said fuel controller and said scheduling algorithm receives as an input an emissions trim factor based on an estimated emission level generated by the emissions transfer function;
    an emission sensor measuring an emission level in the exhaust, wherein said sensor has an operating mode and a suspended mode, and
    an emissions trim factor switch selectively applying to the emissions transfer function a current emissions correction factor when said sensor is in the operating mode and a prior emissions correction factor when the sensor is in the suspended mode.

2. A system as in claim 1 wherein the emissions correction factor is a ratio of a prior estimated operating parameter and a current output of the sensor.

3. A system as in claim 1 wherein said emission sensor is a single sensor.

4. A system as in claim 1 wherein said emission sensor is healthy during the operating mode.

5. A system as in claim 1 wherein said emission sensor is placed in the suspended mode when said sensor is operating outside of a predetermined range.

6. A system as in claim 1 wherein said emission sensor is suspended during a period of steady state gas turbine operation and the estimated emission level is determined during said period of steady state gas turbine operation.

7. A system as in claim 1 wherein the emission sensor is a nitrogen oxide (NOx) emission sensor.

8. A system as in claim 1 wherein the prior emissions correction factor is a preceding prior emissions correction factor.

9. A system for determining an estimated operating parameter for a gas turbine comprising:
    a controller including a processor executing a gas turbine control scheduling algorithm and an emissions transfer function stored in electronic memory of the controller, wherein said scheduling algorithm outputs a turbine condition request signal applied to generate a control command for said gas turbine and said scheduling algorithm receives as an input an emissions trim factor based on an estimated emission level generated by the emissions transfer function;
    an emission sensor measuring an emission level in the exhaust, wherein said sensor has an operating mode and a suspended mode, and
    an emissions trim factor switch selectively applying to the emissions transfer function a current emissions correction factor when said sensor is in the operating mode and a prior emissions correction factor when the sensor is in the suspended mode.

10. A system as in claim 9 wherein the emissions correction factor is a ratio of a prior estimated operating parameter and a current output of the sensor.

11. A system as in claim 9 wherein said emission sensor is placed in the suspended mode when said sensor is operating outside of a predetermined range.

12. A system as in claim 9 wherein said emission sensor is suspended during a period of steady state gas turbine operation and the estimated emission level is determined during said period of steady state gas turbine operation.

13. A system as in claim 9 wherein the emission sensor is a nitrogen oxide (NOx) emission sensor.

14. A system as in claim 9 wherein the prior emissions correction factor is a preceding prior emissions correction factor.

15. A method for determining an estimated operating parameter for a gas turbine having an exhaust and a fuel controller wherein the controller includes a processor executing a combustion temperature scheduling algorithm and emissions transfer function stored in electronic memory of the controller, said method comprising:
    outputting a temperature request signal by the scheduling algorithm to generate a fuel control command for said fuel controller;
    receiving by the scheduling algorithm an emissions trim factor based on an estimated emission level generated by the emissions transfer function, wherein said emissions transfer function includes a emissions correction factor;
    measuring a emission level by an emission sensor in the exhaust, wherein said sensor has an operating mode and a suspended mode;
    using the emission level measured by the emission sensor to generate a current emissions correction factor;
    selectively switching the sensor between said modes, wherein the current emissions correction factor is selected when said sensor is in the operating mode and a prior emissions correction factor is selected when the sensor is in the suspended mode.

16. The method of claim 15 wherein the current emissions correction factor is a ratio of a prior estimated operating parameter and a current output of the sensor.

17. The method of claim 15 wherein said emission sensor is a single sensor and said sensor does not measure the emission level when in the suspended mode.

18. The method of claim 15 wherein said emission sensor is operating within a predetermined range of sensor outputs during the operating mode.

19. The method of claim 15 wherein said emission sensor is placed in the suspended mode while said sensor is operating outside of a predetermined range.

20. The method of claim 15 wherein said emission sensor is placed in the suspended mode during a period of steady state operation of the gas turbine.

* * * * *